United States Patent
Honda

(10) Patent No.: US 12,296,569 B2
(45) Date of Patent: May 13, 2025

(54) SUBSTRATE LAMINATING APPARATUS AND SUBSTRATE LAMINATING METHOD

(71) Applicant: OLYMPUS CORPORATION, Tokyo (JP)

(72) Inventor: Masashi Honda, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 127 days.

(21) Appl. No.: 18/200,273

(22) Filed: May 22, 2023

(65) Prior Publication Data

US 2023/0286256 A1    Sep. 14, 2023

Related U.S. Application Data

(63) Continuation of application No. PCT/JP2021/017271, filed on Apr. 30, 2021.

(51) Int. Cl.
| | | |
|---|---|---|
| *B32B 41/00* | (2006.01) | |
| *B32B 37/00* | (2006.01) | |
| *B32B 37/12* | (2006.01) | |
| *C09J 5/00* | (2006.01) | |

(52) U.S. Cl.
CPC ...... *B32B 37/0046* (2013.01); *B32B 37/1284* (2013.01); *B32B 41/00* (2013.01); *C09J 5/00* (2013.01); *B32B 2551/00* (2013.01)

(58) Field of Classification Search
CPC . B32B 37/0046; B32B 37/1284; B32B 41/00; B32B 2551/00; C09J 2203/318; C09J 2203/326; C09J 7/50; C09J 5/00
USPC ................ 156/60, 64, 350, 351, 378, 379
See application file for complete search history.

(56) References Cited

U.S. PATENT DOCUMENTS

| | | |
|---|---|---|
| 6,716,294 B1 | 4/2004 | Vetrini |
| 2003/0075267 A1 | 4/2003 | Shinohara et al. |
| 2010/0208354 A1 | 8/2010 | Okazaki et al. |
| 2014/0246148 A1* | 9/2014 | Liu ............... C09J 5/00 156/60 |
| 2017/0221856 A1* | 8/2017 | Yamauchi ........... H01L 24/94 |

FOREIGN PATENT DOCUMENTS

| | | |
|---|---|---|
| JP | 2002-512379 A | 4/2002 |
| JP | 2002-251804 A | 9/2002 |
| JP | 2003-225852 A | 8/2003 |
| JP | 2005-333005 A | 12/2005 |
| WO | 2009/133756 A1 | 11/2009 |

OTHER PUBLICATIONS

International Search Report dated Aug. 3, 2021 received in PCT/JP2021/017271.

* cited by examiner

*Primary Examiner* — Michael N Orlando
*Assistant Examiner* — Joshel Rivera
(74) *Attorney, Agent, or Firm* — Scully, Scott, Murphy & Presser, P.C.

(57) ABSTRACT

A substrate laminating apparatus includes: a first holding mechanism configured to hold a first substrate; a second holding mechanism configured to hold a second substrate and change a distance between the first substrate and the second substrate; a load detecting mechanism configured to detect a load originated from a surface tension acting between the first substrate and the second substrate; and a driving mechanism configured to control a distance between the first substrate and the second substrate based on a detection value of the load detecting mechanism.

10 Claims, 9 Drawing Sheets

SUBSTRATE LAMINATING APPARATUS AND SUBSTRATE LAMINATING METHOD

CROSS-REFERENCE TO RELATED APPLICATION

This application is a continuation of International Application No. PCT/JP2021/017271, filed on Apr. 30, 2021, the entire contents of which are incorporated herein by reference.

BACKGROUND

1. Technical Field

The present disclosure relates to a substrate laminating apparatus and a substrate laminating method.

2. Related Art

A method of manufacturing a laminated optical device by bonding (adhering) lens sheets in which plural optical devices are arranged in an array with adhesive in a laminated manner, and the by cutting the lens sheet has been known (for example, WO2009/133756).

SUMMARY

In some embodiments, a substrate laminating apparatus includes: a first holding mechanism configured to hold a first substrate; a second holding mechanism configured to hold a second substrate and change a distance between the first substrate and the second substrate; a load detecting mechanism configured to detect a load originated from a surface tension acting between the first substrate and the second substrate; and a driving mechanism configured to control a distance between the first substrate and the second substrate based on a detection value of the load detecting mechanism.

In some embodiments, a substrate laminating method includes: holding a first substrate by a first holding mechanism; applying an adhesive to a predetermined area of at least one of the first substrate and the second substrate and between the first substrate and the second substrate by an adhesive applying mechanism; holding a second substrate to face the first substrate by a second holding mechanism; bringing the first substrate and the second substrate closer to each other by a driving mechanism; detecting a tensile load between the substrates originated from a surface tension acting between the first substrate and the second substrate by a load detecting mechanism; detecting that the tensile load between substrates has reached a predetermined value by the load detecting mechanism; and stopping movement to bring the first substrate and the second substrate closer to each other by the driving mechanism when it is detected that the tensile load between the substrates has reached the predetermined value.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, embodiments of a substrate laminating apparatus and a substrate laminating method according to the disclosure will be explained with reference to the drawings. The disclosure is not intended to be limited to the following embodiments, and components of the following embodiments include those easily replaceable by those skilled in the art, and those substantially the same also.

Substrate Laminating Apparatus A configuration of the substrate laminating apparatus according to the embodiment of the disclosure will be explained, referring to FIG. 1 and FIG. 2. A substrate laminating apparatus 1 according to the embodiment is an apparatus to laminate plural substrates. The substrate laminating apparatus 1 reduces variation in spread of an adhesive (wet area) by optimizing a distance (gap) between substrates when plural substrates are laminated by an adhesive.

Examples of substrates to be laminated by the substrate laminating apparatus 1 include a glass substrate, a semiconductor substrate, micro electro mechanical systems (MEMS), and the like. The substrate laminating apparatus 1 can laminate not only substrates with each other, but also optical devices with each other, and a substrate and an optical device also. In the following, an example of laminating plural glass substrates by the substrate laminating apparatus 1 will be explained. The number of sheets of substrates to be laminated by the substrate laminating apparatus 1 is not particularly limited as long as two or more sheets are laminated.

Figure 1:
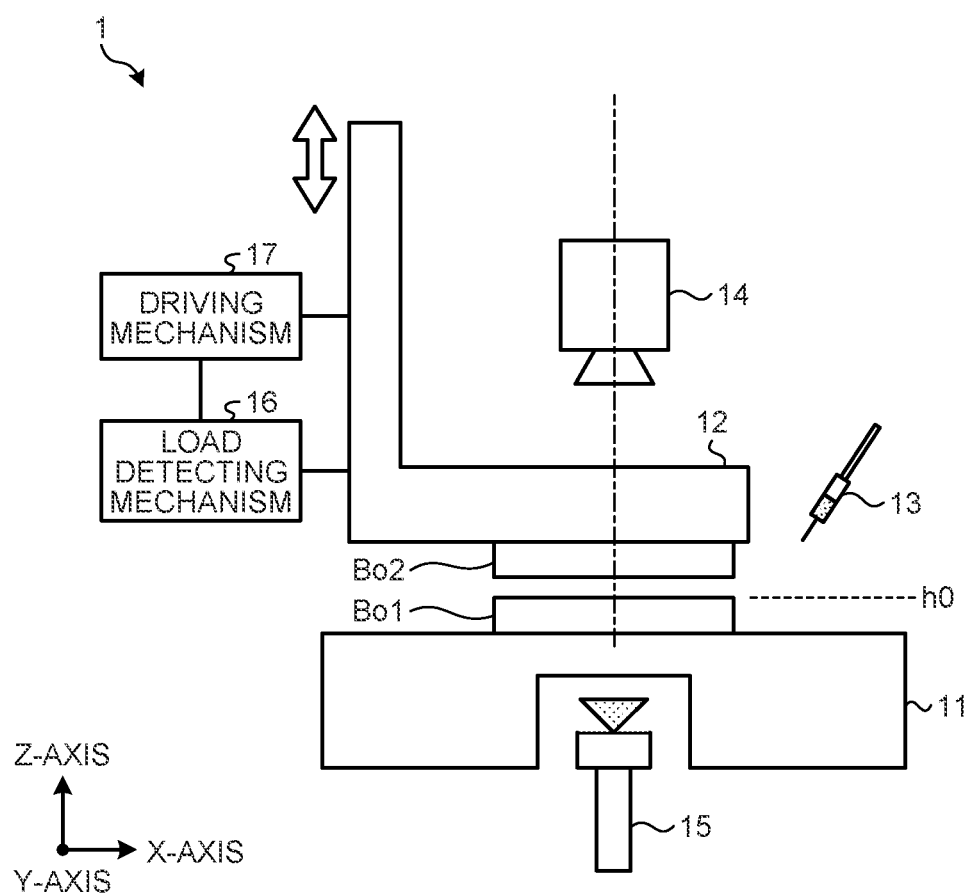
FIG. 1 is a schematic diagram illustrating an example of a configuration of a substrate laminating apparatus according to an embodiment of the disclosure.

The substrate laminating apparatus 1 includes, as illustrated in FIG. 1, a first holding mechanism 11, a second holding mechanism 12, an adhesion applying mechanism 13, an imaging device 14, a curing mechanism 15, a load detecting mechanism 16, and a driving mechanism 17.

The first holding mechanism 11 holds a first substrate Bo1 by sucking the first substrate Bo1 from an underside. The first holding mechanism 11 is configured to be movable in an X-axis direction and a Y-axis direction. Moreover, the first holding mechanism 11 is configured to be rotatable about the X-axis, the Y-axis, and the Z-axis. Furthermore, the first holding mechanism 11 functions as a position adjusting mechanism to adjust a relative position in a surface direction (XY plane direction, horizontal direction) between the first substrate Bo1 and a second substrate Bo2.

The second holding mechanism 12 holds the second substrate Bot by sucking from an upside. The second holding mechanism 12 is configured to be movable in the Z-axis direction. Moreover, the second holding mechanism 12 can change a distance between the first substrate Bo1 and the second substrate Bo2 by moving in the Z-axis direr-ton. A height h0 of an upper surface of the first substrate Bo1 illustrated in FIG. 1 is a reference position height(zero point) when the second holding mechanism 12 moves in the Z-axis direction.

The second holding mechanism 12 holds the second substrate Bo2 to face the first substrate Bo1 to which an adhesive is applied by the adhesive applying mechanism 13. As described, by holding the first substrate Bo1 by the first holding mechanism 11, and by holding the second substrate Bo2 by the second holding mechanism 12, the first substrate Bo1 and the second substrate Bo2 are held to be parallel to each other and to face each other.

The adhesive applying mechanism 13 applies an adhesive between the first substrate Bo1 and the second substrate Bo2. The adhesive applying mechanism 13 applies a predetermined amount of adhesive to, for example, a predetermined area of the first substrate Bo1 held by the first holding mechanism 11. The adhesive applying mechanism 13 is constituted of, for example, a dispenser (liquid metering dispenser device) and a syringe connected to the dispenser.

Moreover, as the adhesive, a UV-curable adhesive or a light-curable adhesive curable by visible light and the like can be used. Moreover, as the adhesive, for example, a thermosetting, or radiation-curable adhesive may be used, other than a UV-curable or light-curable adhesive.

Characteristics of the adhesive, such as viscosity and hardness after cure may be chosen appropriately according to an area of a bonding surface or a required thickness of the cured adhesive. However, an adhesive having an excessively low viscosity spreads too much on a substrate before laminating substrates, resulting in a problem that air bubbles are accidentally trapped at bonding or the like. Therefore, it is preferable that an adhesive having appropriate viscosity be selected.

The imaging device 14 captures an alignment mark formed on the first substrate Bo1 and the second substrate Bo2, a state of application of the adhesive, and the like to check when bonding the first substrate Bo1 and the second substrate Bo2. The imaging device 14 is constituted of, for example, a camera including an imager, such as a charge coupled device (CCD) and a CMOS imaging sensor (CIS). The imaging device 14 in the configuration of the present embodiment is arranged above the first substrate Bo1 as illustrated in FIG. 1, but it may be arranged below the second substrate Bo2 as necessary.

The curing mechanism 15 cures the adhesive between the first substrate Bo1 and the second substrate Bo2. The curing mechanism 15 is constituted of, for example, a UV irradiation head, or the like. The curing mechanism 15 in the configuration of the present embodiment is arranged below the first substrate Bo1 and the second substrate Bo2 as illustrated in FIG. 1, but it may be arranged above the first substrate Bo1 and the second substrate Bo2 as necessary.

The curing mechanism 15 cures the adhesive after adjustment of a relative position in a surface direction (X-Y plane direction, horizontal direction) between the substrates by the first holding mechanism 11 and adjustment of a distance between the substrates by the driving mechanism 17 are completed. More specifically, the curing mechanism 15 cures the adhesive when the load detecting mechanism 16 detects that a tensile load between the first substrate Bo1 and the second substrate Bo2 has reached a predetermined value, and when the driving mechanism 17 stops bringing the first substrate Bo1 and the second substrate Bo2 closer to each other.

The curing mechanism 15 may cure the adhesive when spread of the adhesive is checked with an image captured by the imaging device 14 and the spread of the adhesive has met a predetermined spread state, in addition to detection of the tensile load between the first substrate Bo1 and the second substrate Bo2 having reached the predetermined value by the load detecting mechanism 16. In this case, determination whether the spread of the adhesive has met a predetermined spread state may be performed by using an image processing technique and the like, or may be confirmed manually.

The load detecting mechanism 16 detects a load originated from a surface tension acting between the first substrate Bo1 and the second substrate Bo2. This "load originated from a surface tension" specifically signifies a load originated from a surface tension of the adhesive between the first substrate Bo1 and the second substrate Bo2. The load detecting mechanism 16 is constituted of, for example, a load cell, a pressure sensor, a weight sensor, and the like.

The load detecting mechanism 16 detects, specifically, a tensile load between substrates originated from the surface tension of the adhesive between the first substrate Bo1 and the second substrate Bo2. This "tensile load between substrates" specifically signifies a load (negative load) of the second substrate Bo2 pulled to the first substrate Bo1 by the surface tension of the adhesive applied on the first substrate Bo1.

The driving mechanism 17 moves the second holding mechanism 12 the Z-axis direction to change a distance between the first substrate Bo1 and the second substrate Bo2. Specifically, the driving mechanism 17 controls the distance between the first substrate Bo1 and the second substrate Bo2 based on a detection value of the load detecting mechanism 16.

The driving mechanism 17 moves the second holding mechanism 12 in the Z-axis direction, to bring the second substrate Bo2 closer to the first substrate Bo1 after hold of the first substrate Bo1 by the first holding mechanism 11 (first holding process), application of the adhesive by the adhesive applying mechanism 13 (application process), hold of the second substrate Bo2 by the second holding mechanism (second holding process), and adjustment of a relative position in the surface direction (X-Y plane direction, horizontal direction) by the first holding mechanism 11 (position adjustment process) are completed. Thereafter, when the load detecting mechanism 16 detects that the tensile load between substrates has reached the predetermined value, approach of the first substrate Bo1 and the second substrate Bo2 each other is stopped.

The substrate laminating apparatus 1 according to the present embodiment bonds the first substrate Bo1 and the second substrate Bot by moving down the second substrate Bo2 held by the second holding mechanism 12 in the Z-axis direction to the first substrate Bo1 on which the adhesive is applied. FIG. 2 shows a load generated on the second substrate Bo2 (that is, the load detected by the load detecting mechanism 16) when the second substrate Bo2 comes in contact with the adhesive applied on the first substrate Bo1. In the graph shown in the drawing, the vertical axis represents a load generated on the second substrate Bo2, and the horizontal axis represents a position of the second substrate Bo2 in the Z-axis direction (height of the second substrate Bo2).

Figure 2:
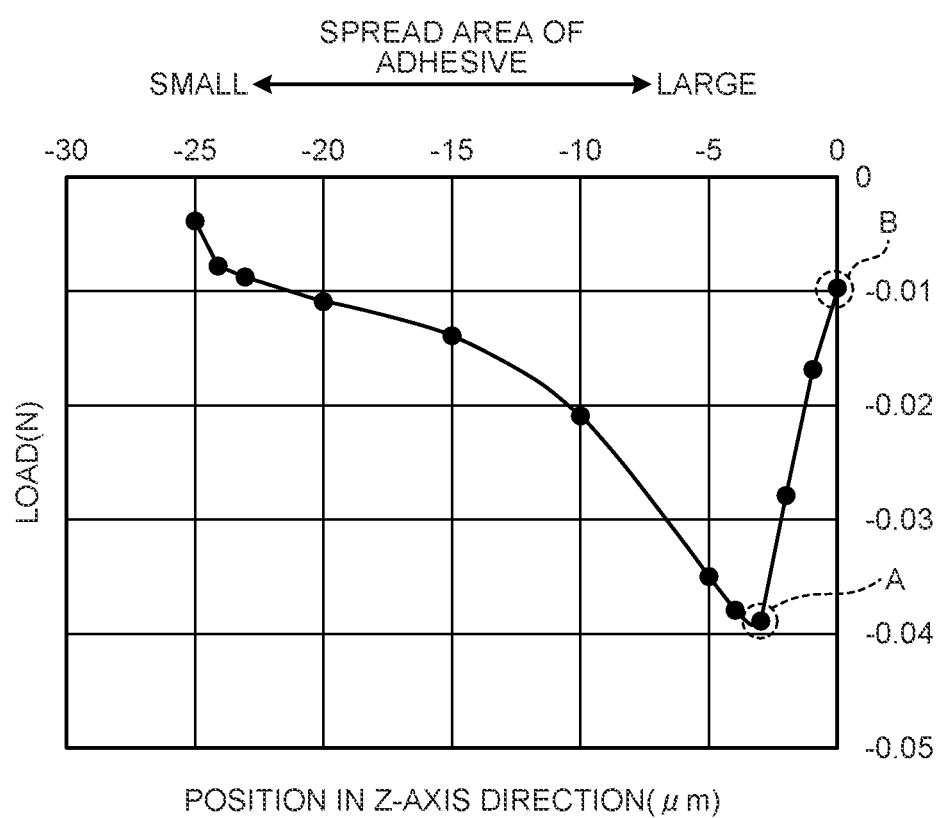
FIG. 2 is a graph showing a load generated by surface tension of an adhesive between the substrates when the substrates come in contact with each other in a substrate laminating method according to the embodiment of the disclosure.
Figure 3:
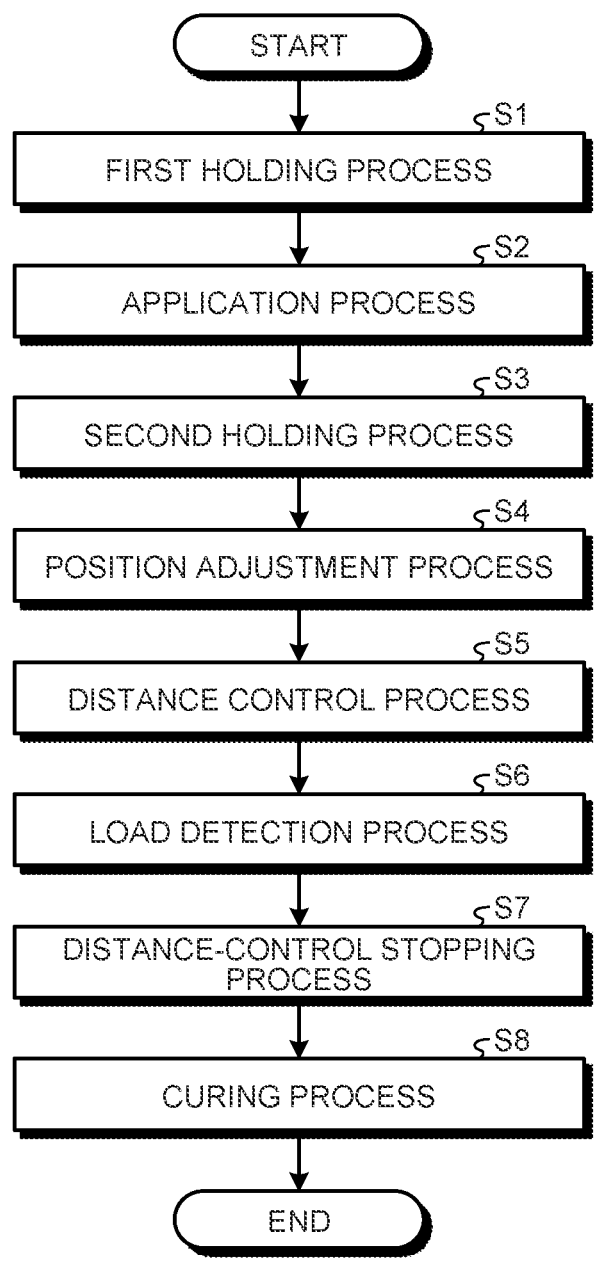
FIG. 3 is a flowchart illustrating an example of the substrate laminating method according to the embodiment of the disclosure.

As shown in FIG. 2, when the second substrate Bo2 comes in contact with the adhesive applied on the first substrate Bo1, a negative load is generated by the surface tension of the adhesive. Subsequently, when the second substrate Bo2 brought further downward to make the adhesive spread, a maximum negative load of "−0.03 N to −0.05 N" is generated as indicated at part A. When the spread of the adhesive is completed, the load rapidly becomes a value near 0 as indicated at part B.

As described, when plural substrates are bonded by using an adhesive, a force (load) of bringing the substrates to each other occurs by the surface tension of the adhesive between the substrates, and this is detected as a negative load by the load detecting mechanism 16. By thus detecting a load acting on the second substrate Bo2 by the load detecting mechanism 16, it is possible to detect that the second substrate Bo2 has come into contact with the adhesive.

As the adhesive between the substrates spreads to a range according to a distance between the substrates and a volume of the adhesive (as a bonding area (spread area) of the adhesive increases), the tensile load between the substrates decreases, and at the point of time when the adhesive has spread fully, the load suddenly decreases (refer to part A in FIG. 2). As described, the substrate laminating apparatus 1 according to the present embodiment can laminate plural substrates appropriately and stably while detecting that an adhesive between the substrates has spread appropriately by performing a control of a distance between the substrates (gap control) using a load acting on the second substrate Bo2 becoming a predetermined value as a target value.

The values shown in FIG. 2 are one example, and the value of a generated load varies according to the shape and the area of a bonded area. For example, a maximum negative load of "−0.15 N to −0.25 N" can be generated at part A in the figure when the adhesive between substrates spreads, and a load can be "−0.04 N" at part B in the figure when the spread of the adhesive is completed.

Substrate Laminating Method

A substrate laminating method performed by the substrate laminating apparatus 1 according to an embodiment of the disclosure will be explained, referring to FIG. 3 to FIG. 10. In the substrate laminating method, as illustrate in FIG. 3, a first holding process (step S1), an application process (step S2), a second holding process (step S3), a position adjustment process (step S4), a distance control process (step S5), a load detection process (step S6), a distance-control stopping process (step S7), and curing process (step S8) are performed in this order.

In the following explanation, a case in which three pieces of substrates constituted of the first substrate Bo1, the second substrate Bo2, and a third substrate Bo3 are laminated sequentially in the Z-axis direction will be explained as an example. In this case, a process of bonding the first substrate Bo1 and the second substrate Bo2 by following steps S1 to S8 in FIG. 3 (hereinafter, "first laminating process") and a process of bonding a substrate obtained by bonding the first substrate Bo1 and the second substrate Bo2 (hereinafter, "first laminated substrate") and the third substrate Bo3 by following steps S1 to S8 in the same drawing (hereinafter, "second laminating process") are performed in this order.

Figure 4:
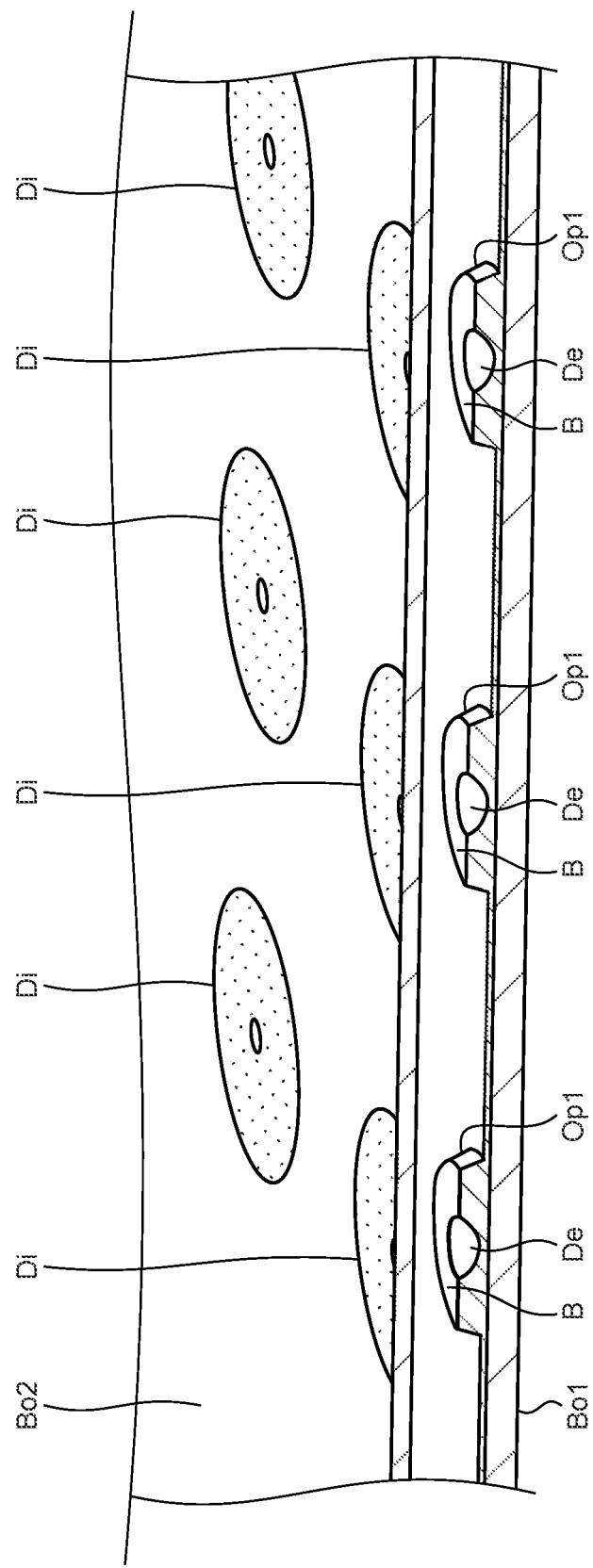
FIG. 4 is a perspective view illustrating a state in which a second substrate is laminated to a first substrate in the substrate laminating method according to the embodiment of the disclosure.
Figure 5:
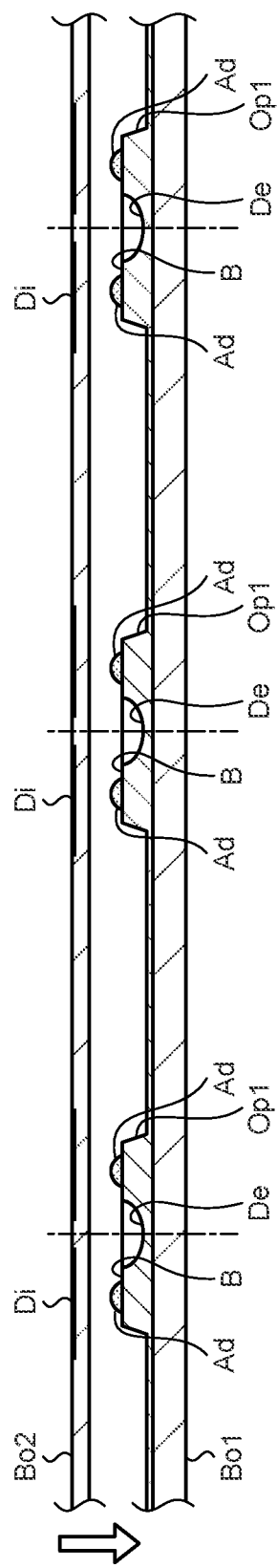
FIG. 5 is a cross-section illustrating a state in which the second substrate is laminated to the first substrate in the substrate laminating method according to the embodiment of the disclosure.

The first substrate Bo1 is constituted of a glass substrate in which plural first optical devices Op1 are arrange in an array as illustrated in FIG. 4 and FIG. 5 This first optical device Op1 includes a concave portion De that functions as an optical functional unit, and a stopper portion B which has a flat surface on which an adhesive is applied. Moreover, the first optical device Op1 is formed in one piece by using, for example, energy-curable resin. Therefore, the first optical devices Op1 are connected with each other with resin.

The second substrate Bo2 is constituted of a glass substrate in which plural optical apertures Di are arranged as illustrated in FIG. 4 and the FIG. 5. This optical aperture Di is to improve the optical performance. The optical aperture Di is arranged on an upper surface of the second substrate Bo2 by etching or the like after a film is formed by vapor deposition, plating, or the like using, for example, chromium oxide, black chromium, or the like as a material.

The optical aperture Di can be arranged by various methods, not limited to vapor deposition and plating, and it can be arranged, for example, by bonding a sheet-shaped member formed by forming a hole in a metal film onto the second substrate Bo2, or by applying black ink. Furthermore, when lanthanum-based nitride having poor adhesivity is used for the second substrate Bo2, it is preferable that the optical aperture Di is arranged on a lower surface (bonding surface with the first substrate Bo1) of the second substrate Bo2, and the high adhesivity between an adhesive Ad and the optical aperture Di be utilized.

Moreover, although the optical aperture Di is arranged on the upper surface of the second substrate Bo2 in FIG. 4 and FIG. 5, it is only necessary to be arranged at a position appropriate for optical design, and it may be arranged on the lower surface of the second substrate Bo2 (the bonding surface with the first substrate Bo1), between the second substrate Bo2 and the first optical device Op1 of the first substrate Bo1, on a lower surface of the first substrate Bo1, or the like.

Figure 6:
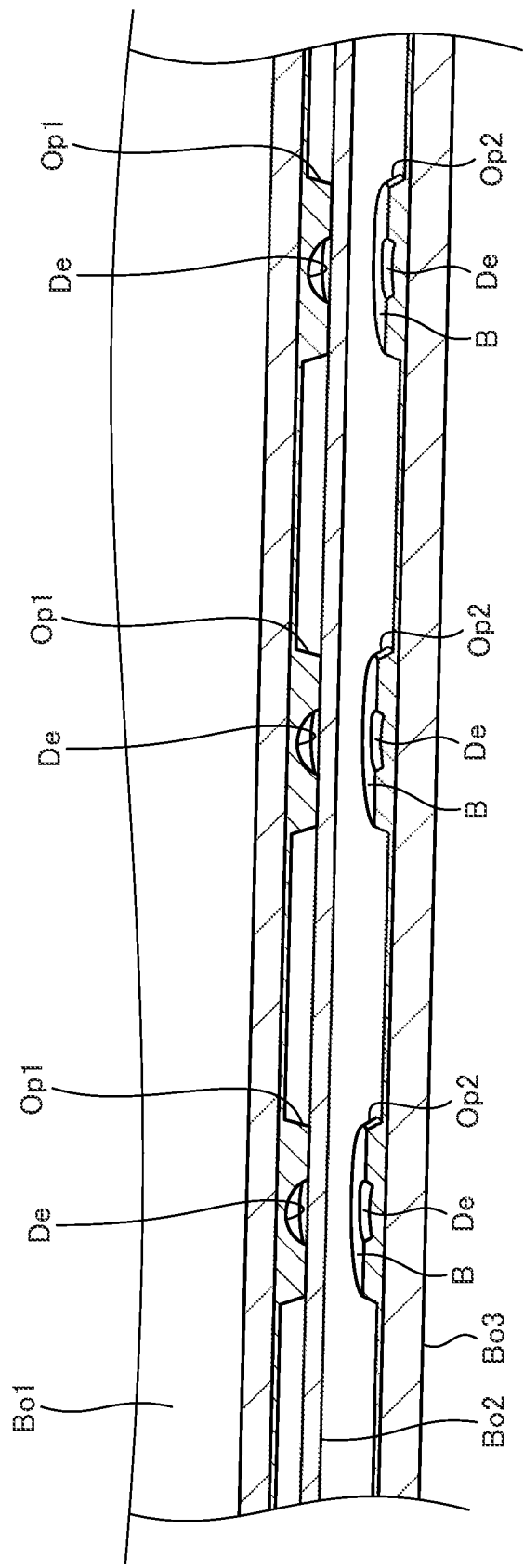
FIG. 6 is a perspective view illustrating a state in which a third substrate is laminated to a first laminated substrate, which is the first substrate and the second substrate laminated each other, in the substrate laminating method according to the embodiment of the disclosure.
Figure 7:
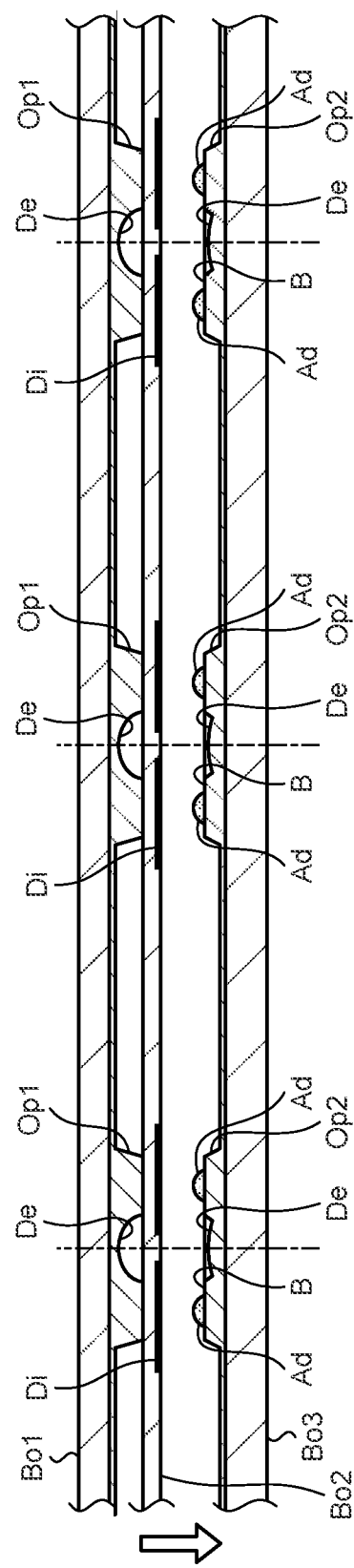
FIG. 7 is a cross-section illustrating a state in which the third substrate is laminated to the first laminated substrate in the substrate laminating method according to the embodiment of the disclosure.

The third substrate Bo3 is constituted of a glass substrate in which plural second optical devices Op2 are arranged in an array as illustrated in FIG. 6 and FIG. 7. This second optical device Op2 includes a concave portion De that functions as an optical functional unit, and the stopper portion B. Moreover, the second optical device Op2 is formed in one piece by using, for example, energy-curable resin. Therefore, the second optical devices Op2 are connected with each other with resin.

First Laminating Process

In the first holding process, the first holding mechanism 11 holds the first substrate Bo1.

In the application process, the adhesive applying mechanism 13 applies the adhesive Ad in a predetermined area of each of the first optical Op1 arranged on the first substrate Bo1 as illustrated in FIG. 5. In the application process, specifically, the adhesive Ad is applied to the stopper portion B of the first optical device Op1.

Although the adhesive Ad is applied to the stopper portion B of the first optical device Opt in FIG. 5, the adhesive Ad may be applied to a portion on the side of the second substrate Bo2 facing the stopper portion B. However, by applying the adhesive Ad to the side of the first optical device Op1, a flow of the adhesive Ad stops at the ridge of the stopper portion B, thereby preventing an overflow to an optical surface. Therefore, it is more preferable to apply the adhesive Ad to the side of the first optical device Op1.

Figure 8:
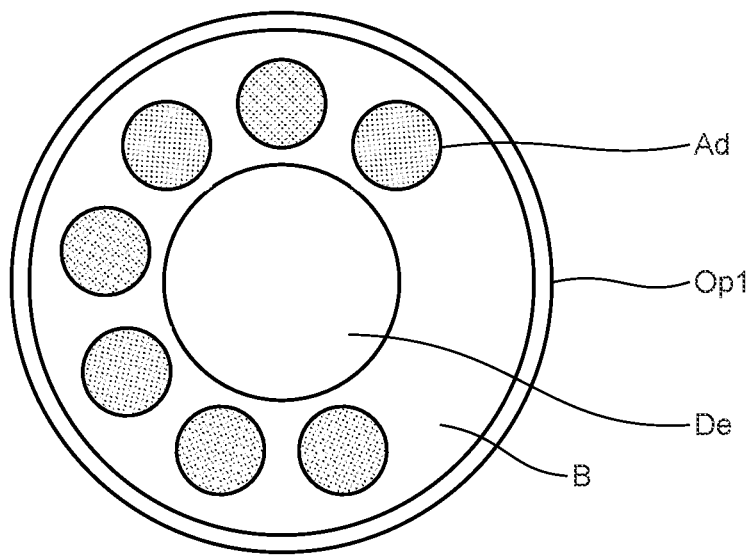
FIG. 8 is a plan view illustrating an example of an application method of an adhesive in the substrate laminating method according to the embodiment of the disclosure.

In the application process, for example, the adhesive Ad is applied at multiple points in spots in a circular shape on an upper surface of the stopper portion B formed in a ring shape as illustrated in FIG. 8 (multi-point application). Moreover, in the application process, as illustrated in the drawing, it is preferable to apply the adhesive Ad nonuniformly in an area excluding a part of the entire circumference of the stopper portion B, not applying the adhesive Ad uniformly on the entire circumference of the stopper portion B. For example, when application is possible in the total of nine spots if the adhesive Ad is applied uniformly on the entire circumference of the stopper portion B, it is preferable to decrease the number of application spots of the adhesive Ad to seven spots, which is less than nine spots. Note that the total amount of the adhesive Ad when the adhesive Ad is applied to seven spots is preferable to be the same amount as the total amount of the adhesive Ad in the case of applying the adhesive Ad to nine spots.

If the adhesive Ad is applied uniformly to the stopper portion B, when the second substrate Bo2 is brought close to the first substrate Bo1, spot-shaped portions of the adhesive Ad on the stopper portion B are bonded with each other before unnecessary air inside the concave portion De of the first optical device Op1 is released to the outside, resulting in a state in which unnecessary air is trapped in the concave portion De. When the substrates are brought closer to each other, the adhesive Ad is pushed out to the outside by the unnecessary air inside the concave portion De, and the spread of the adhesive Ad on the stopper portion B is to be insufficient spread. In addition, the spread state of the adhesive Ad on the respective first optical devices Op1 varies. If the spread of the adhesive Ad is insufficient or the spread state of the adhesive Ad varies as described, the bonding strength between substrates can be reduced, and the optical performance can be decreased as a result of reflection caused by the unnecessary air.

On the other hand, when the adhesive Ad is applied nonuniformly on the stopper portion B as illustrated in FIG. 8, when the second substrate Bot is brought close to the first substrate Bo1, spot-shaped portions of the adhesive Ad on the stopper portion B are bonded with each other after unnecessary air inside the concave portion De of the first optical device Op1 is released to the outside. When the substrates are brought closer to each other, because unnecessary air is not left inside the concave portion De, the adhesive Ad spreads uniformly on the stopper portion B. By thus applying the adhesive Ad in an area excluding a part of the entire circumference of the stopper portion B, the adhesive Ad can be spread sufficiently on the stopper portion B, and variation in the spread of the adhesive Ad among the respective first optical devices Opt can be reduced. Therefore, reduction of the bonding strength between substrates and deterioration in the optical performance can be suppressed.

Although an example in which the adhesive Ad is applied at multiple points in spots in an area excluding a part of the entire circumference of the stopper portion B has been described in FIG. 8, the adhesive Ad may be applied, for example, continuously and linearly in an area excluding a part of the entire circumference of the stopper portion B. Also when the adhesive Ad is applied linearly as described, reduction of the bonding strength between substrates and deterioration in the optical performance can be suppressed similarly to the case of applying the adhesive Ad in spots.

Figure 9:
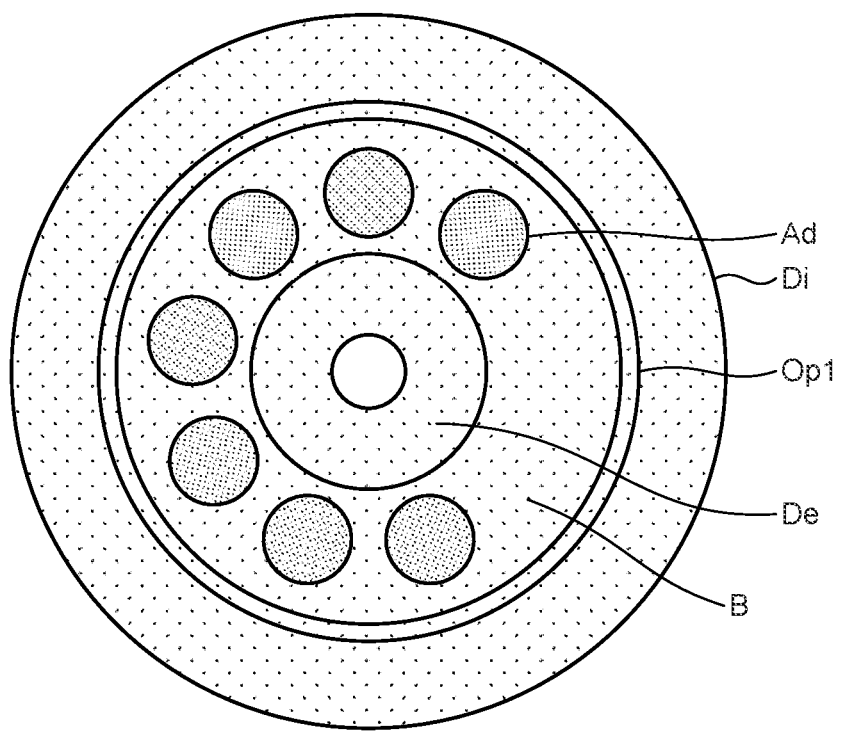
FIG. 9 is a plan view illustrating a relationship between a region to which an adhesive is applied and a region in which an optical aperture is arranged in the substrate laminating method according to The embodiment of the disclosure.

As illustrated in FIG. 9, the area to which the adhesive Ad is applied on the first substrate Bo1 overlaps the area in which the optical aperture Di of the second substrate Bo2 is arranged. Accordingly, for example, even if an image is captured by the imaging device 14 from above the second substrate Bo2, it is difficult to check the spread state of the adhesive Ad. Note that the illustration of the drawing shows the adhesive Ad for convenience of explanation.

In the second holding process, the second holding mechanism 12 holds the second substrate Bo2.

Figure 10:
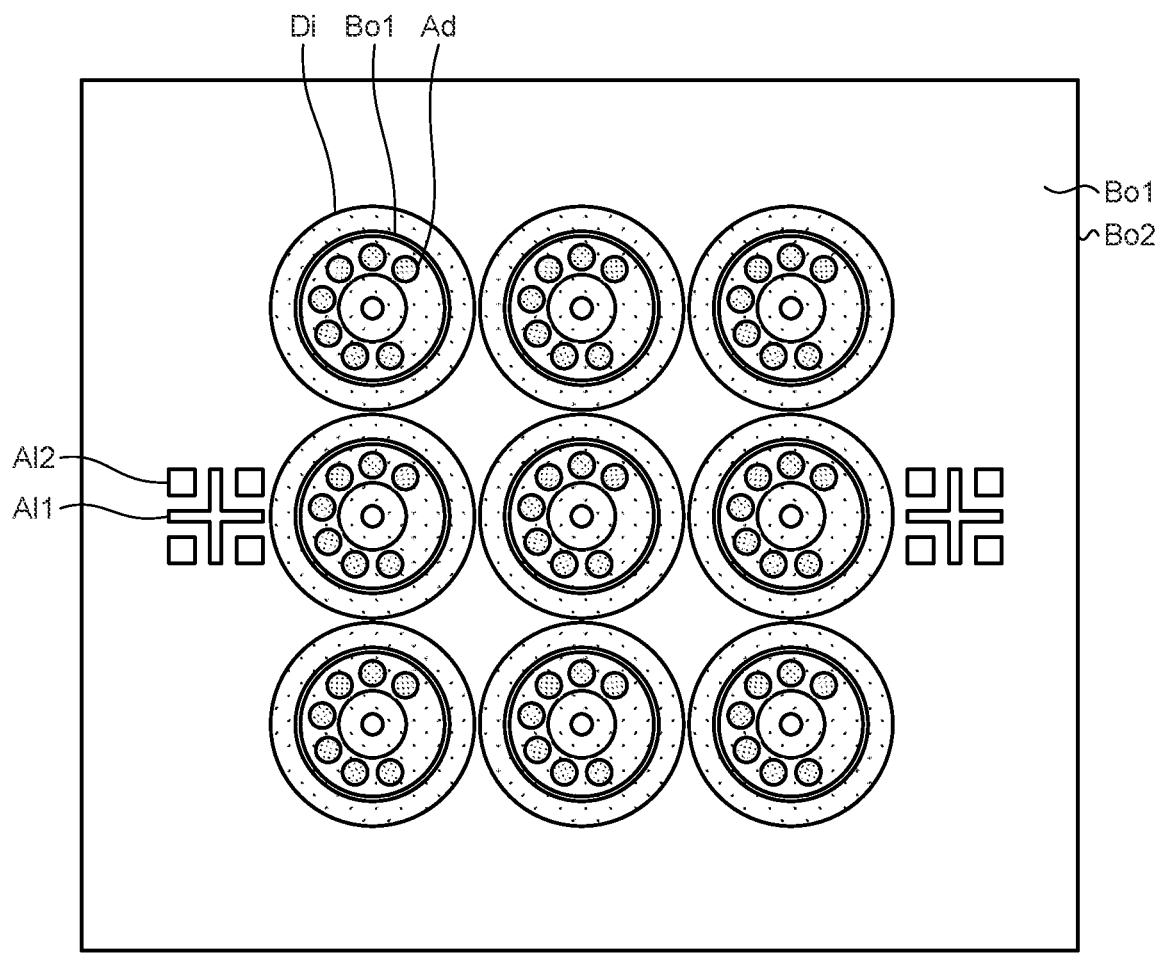
FIG. 10 is a plan view illustrating a state in which the second substrate has been laminated to the first substrate in the substrate laminating method according to the embodiment of the disclosure.

In the position adjustment process, by moving the first holding mechanism 11 in the X-axis direction and the Y-axis direction, the relative position of the first substrate Bo1 and the second substrate Bo2 in the surface direction (X-Y plane direction, horizontal direction) is adjusted. In the position adjustment process, specifically, the imaging device 14 captures the first substrate Bo1 and the second substrate Bo2, and the position adjustment of each substrate is performed while checking alignment marks A11, A12 formed on each of the substrates as illustrated in FIG. 10, For example, the alignment mark A11 is arranged on the first substrate Bo1, and the alignment mark A12 is arranged on the second substrate Bo2. In the position adjustment process, for example, by matching the center of the alignment mark A11 in a cross shape arranged on the first substrate Bo1 with the center of the alignment mark A12 of four squares arranged on the second substrate Bo2, the positioning of each substrate is performed. As described, by using the alignment marks A11, A12, the positioning of the first substrate Bo1 and the second substrate Bo2 can be performed precisely.

In the distance control process, as illustrated in FIG. 5, the driving mechanism 17 moves the second holding mechanism 12 in the Z-axis direction, to thereby bring the first substrate Bo1 and the second substrate Bo2 to be closer to each other.

In the load detection process, the load detecting mechanism 16 detects a tensile load between the substrates originated from the surface tension of the adhesive Ad between the first substrate Bo1 and the second substrate Bo2. Moreover, in the load detection process, the load detecting mechanism 16 detects that the tensile load between substrates has become a predetermined value In detail, in the load detection process, the load detecting mechanism 16 detects that the tensile load between substrates has reached a predetermined value according to following procedures (1) to (4) as illustrated in FIG. 2 also.

(1) Detect a tensile load between substrates that is generated by the surface tension of the adhesive Ad caused when the first substrate Bo1 and the second substrate Bo2 come into contact through the adhesive Ad.
(2) Detect an increase of the tensile load between substrates as the first substrate Bo1 and the second substrate Bo2 come closer to each other.
(3) Detect decrease of the tensile load between substrates as a contact area (spread area) of the adhesive Ad increases.
(4) Detect that the tensile load between the substrates has decreased to the predetermined value. As described, by detecting that the tensile load between substrates has decreased to a predetermined value, it is possible to detect that the spread of the adhesive Ad on each of the stopper portions B of all of the first optical devices Op1 arranged in the first substrate Bo1 has completed.

The "predetermined value" signifies a value of load near 0 as indicated at part B in FIG. 2. This predetermined value can be determined by various methods. For example, the predetermined value can be determined experimentally according to an amount, an area, a shape, and the like of the adhesive Ad on the stopper portion B.

Furthermore, the predetermined value can be determined according to how substrates bonded previously were done, that is, a thickness of an adhesion layer between the substrates previously bonded. For example, when the thickness of the adhesion layer between the substrates bonded previously was thinner than a target thickness, for example, a value of load on further negative side than the load indicated at part B in FIG. 2 can be set as the predetermined value. The thickness of an adhesion layer between substrates to be bonded this time can be thus made thicker, and the total optical performance of an optical device of a laminated substrate can be corrected.

In the distance-control stopping process, when the load detecting mechanism 16 detects than the tensile load between the substrates has reached the predetermined value, the driving mechanism 17 stops bringing the first substrate Bo1 and the second substrate Bo2 closer to each other. In this distance-control stopping process, the thickness of an adhesion layer between substrates is controlled to be, for example, 5 μm to 15 μm.

In the curing process, the curing mechanism 15 cures the adhesive Ad between the first substrate Bo1 and the second substrate Bo2. In the curing process, the spread of the adhesive Ad may be observed in an image captured by the imaging device 14, and the curing mechanism 15 may cure the adhesive Ad when the spread of the adhesive Ad has become a desired state. At that time, determination whether the spread of the adhesive Ad has become a desired state may be performed by using an image processing technique or the like, or may be checked manually. As described, by capturing an image by the imaging device 14, and checking whether the spread of the adhesive Ad has become a desired state, variation in spread of the adhesive Ad can be further reduced.

Moreover, in the curing process, when the adhesive Ad is being cured, a load in a negative direction acting on the second substrate Bo2 increases because of hardening shrinkage of the adhesive Ad, and there is a possibility that an internal stress in the cured adhesion layer increases. Therefore, in the curing process, it is preferable that the adhesive Ad be cured while detecting a load acting on the second substrate Bo2 by the load detecting mechanism 16, and while moving the second holding mechanism 12 the Z-axis direction by the driving mechanism 17 to make the load uniform. In this case, for example, the second substrate Bo2 is pressed to the first substrate Bo1 by a force not as strong as to shear the adhesive Ad between substrates. Thus, the internal stress in the cured adhesion layer can be reduced and, therefore, a failure, such as break of a laminated substrate and peeling off of the adhesive Ad, can be suppressed.

Second Laminating Process

In the first holding process, the first holding mechanism 11 holds the third substrate Bo3.

In the application process, the adhesive applying mechanism 13 applies the adhesive Ad to the stopper portion B of the respective second optical devices Op2 arranged in the third substrate Bo3 as illustrated in FIG. 7.

In the application process, similarly to the application process of the first laminating process, the adhesive Ad is applied at multiple points in spots in a circular shape (multi-point application) on an upper surface of the stopper portion. B formed in a ring shape. Moreover, in the application process, it is preferable to apply the adhesive Ad nonuniformly in an area excluding a part of the entire circumference of the stopper portion B, not applying the adhesive Ad uniformly on the entire circumference of the stopper portion B. For example, when application is possible in the total of nine spots if the adhesive Ad is applied uniformly on the entire circumference of the stopper portion B, it is preferable to decrease the number of application spots of the adhesive Ad to seven spots, which is less than nine spots.

In the second holding process, the second holding mechanism 12 holds the first laminated substrate. In the second holding process, as illustrated in FIG. 6 and FIG. 7, the second holding mechanism 12 holds the first laminated substrate, facing the second substrate Bo2 downward.

In the position adjustment process, by moving the first holding mechanism 11 in the X-axis direction and the Y-axis direction, the relative position of the third substrate Bo3 and the first laminated substrate in the surface direction (X-Y plane direction, horizontal direction) is adjusted. In the position adjustment process, specifically, the imaging device 14 captures the third substrate Bo3 and the first laminated substrate, and the position adjustment of each substrate is performed while checking alignment marks formed on each of the substrates.

In the position adjustment process, for example, by matching an alignment mark arranged on the first laminated substrate with an alignment mark arranged on the third substrate Bo3, the positioning of each substrate is performed. As described, by using the alignment marks, the positioning of the first laminated substrate and the third substrate Bo3 can be performed precisely.

In the distance control process, as illustrated in FIG. 7, the driving mechanism 17 moves the second holding mechanism 12 in the Z-axis direction, to thereby control the distance between the third substrate Bo3 and the first laminated substrate.

In the load detection process, the load detecting mechanism 16 detects a tensile load between the substrates originated from the surface tension of the adhesive Ad between the third substrate Bo3 and the first laminated substrate.

In the distance-control stopping process, when the load detecting mechanism 16 detects that the tensile load between substrates has reached a predetermined value, the driving mechanism 17 stops bringing the third substrate Bo3 and the first laminated substrate closer to each other. In this distance-control stopping process, the thickness of an adhesion layer between substrates is controlled to be, for example, 5 μm to 15 μm.

In the curing process, the curing mechanism 15 cures the adhesive Ad between the third substrate Bo3 and the first laminated substrate. By the procedure described above, the third substrate Bo3 and the first laminated substrate are laminated together. By cutting the laminated substrate after the first laminating process and the second laminating process are completed, a laminated optical device can be manufactured.

In the substrate laminating apparatus and the substrate laminating method according to the present embodiment described above, a control of detecting a tensile load between the substrates caused by the surface tension of the adhesive Ad is performed, instead of a distance control (gap control) between the substrates and a control by image detection or the spread of the adhesive Ad. That have conventionally been performed. In this control, a force of bringing substrates closer to each other (tensile load between substrates)) is generated by the surface tension of the adhesive Ad when the adhesive Ad applied on the first substrate Bo1 comes in contact with the second substrate Bot (refer to FIG. 2). The adhesive Ad spreads between the substrates, and as the spread is finished, the tensile load between substrates approaches 0. That is, a state in which the spread of the adhesive Ad becomes stable can be detected.

As described, according to the substrate laminating apparatus and the substrate laminating method according to the present embodiment, by detecting a surface tension acting between the first substrate Bo1 and the second substrate Bo2, and by controlling a distance between the first substrate Bo1 and the second substrate Bo2 based on the surface tension, even when there are variations in an application amount of the adhesive Ad used to bond the first substrate Bo1 and the second substrate Bo2, the variation in a spread state of the adhesive Ad can be reduced. Therefore, according to the substrate laminating apparatus and the substrate laminating method according to the present embodiment, plural substrates can be laminated together without reducing the bonding strength.

Moreover, according to the substrate laminating apparatus and the substrate laminating method according to the present embodiment, by detecting a state in which the adhesive Ad between substrates has spread appropriately as a load, it is possible to manage both a distance between the substrate and a spread of the adhesive Ad appropriately. Thus, a high quality laminated optical device having an appropriate distance between constituting optical devices, and having a reduced variation in a spread of the adhesive Ad can be manufactured.

Furthermore, for example, as illustrated in FIG. 9, when an area on which the adhesive Ad is applied in the first substrate Bo1 and an area in which the optical aperture Di of the second substrate Bo2 is arranged overlap each other, a spread of the adhesive Ad cannot be checked directly with an image captured by the imaging device 14 or visually. On the other hand, in the substrate laminating apparatus and the substrate laminating method according to the present embodiment, a spread of the adhesive Ad between substrates can be detected as a load. Therefore, it is possible to stably laminate even substrates that include the optical aperture Di as in the drawing and a spread of the adhesive Ad cannot be checked with an image or the like.

In the above, the substrate laminating apparatus and the substrate laminating method according to the disclosure have been explained specifically with embodiments to implement the disclosure, but the gist of the disclosure is not to be limited to these descriptions, and is to be understood broadly based on descriptions in claims. Furthermore, it is needless to say that various changes, modifications, and the like based on these descriptions are also included in the gist of the disclosure.

For example, in the substrate laminating method according to the disclosure, a heating process may be performed after the curing process to cure the adhesive Ad between substrates. In this heating process, for example, heat is applied from above a laminated substrate bonded by the adhesive Ad by using a heating mechanism provided separately. By thus performing the heating process after the curing process, an internal stress in an adhesion layer generated at the time of curing of the adhesive Ad, can be reduced, and a failure, such as break of a laminated substrate and peeling off of the adhesive Ad, can be suppressed.

Moreover, in the substrate laminating method according to the disclosure, when bonding substrates with each other, the bonding may be performed while changing a speed of moving them closer to each other. In this case, in the distance control process, the driving mechanism 17 moves the second holding mechanism 12 at a first speed V1 set in advance in the Z-axis direction, to thereby bring the first substrate Bo1 and the second substrate Bot closer to each other.

Subsequently, in the load detecting process, the load detecting mechanism 16 detects a tensile load between the substrates caused by a surface tension of the adhesive Ad. When the tensile load between the substrates is detected by the load detecting mechanism 16, the driving mechanism. 17 moves the second holding mechanism 12 at a second speed V2 set in advance in the Z-axis direction, in the distance control process, to thereby bring the first substrate Bo1 and the second substrate Bo2 further closer to each other. This second speed V2 is a constant value irrespective of, for example, a displacement or a target position, and is set to a slower speed than the first speed V1.

Subsequently, when it is detected that the tensile load between substrates has reached the predetermined value by the load detecting mechanism 16, the driving mechanism 17 stops moving the first substrate Bo1 and the second substrate Bo2 to fix the distance therebetween in the distance-control stopping process. Thereafter, the curing process is performed. As described, when bonding substrates with each other, by changing the approaching speed while detecting a load generated from the surface tension of the adhesive Ad, even when there is a variation in height of optical devices arranged in the first substrate Bo1 or the second substrate Bo2, an internal stress of an adhesion layer after the adhesive Ad is cured can be reduced, and a variation of distance between the substrates can be reduced.

A laminated substrate to which the substrate laminating method according to the disclosure is applied has a structure in which the concave portion De, which is an optical functional unit, is tightly sealed with the adhesive Ad because the adhesive Ad spreads uniformly. Therefore, it is possible to prevent entrance of cooling water or cleaning water in a later process of a cutting/dividing of the optical device also. Furthermore, an advantageous characteristic of being less affected by temperature and humidity after installation to a product can also be obtained.

In the substrate laminating apparatus and the substrate laminating method according to the disclosure, a surface tension acting between a first substrate and a second substrate is detected, and a distance between the first substrate and the second substrate is controlled based on the surface tension, thereby enabling to reduce a variation in spread of an adhesive even when there is a variation in an application amount of the adhesive used for bonding of the first substrate and the second substrate. Therefore, according to the substrate laminating apparatus and the substrate laminating method according to the disclosure, plural substrates can be bonded together without reducing the bonding strength.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A substrate laminating apparatus configured to laminate a second substrate on a first substrate with uncured adhesive therebetween, the substrate laminating apparatus comprising:
   a first holding mechanism configured to hold the first substrate;
   a second holding mechanism configured to hold the second substrate;
      a driving mechanism configured to control a relative distance between the first substrate and the second substrate;
      a load detecting mechanism configured to detect a load between the first substrate and the second substrate, the load depending on a surface tension of the uncured adhesive, which surface tension is determined by spread of the uncured adhesive, which spread is determined by the relative distance between the first substrate and the second substrate;
      wherein the driving mechanism controls the relative distance between the first substrate and the second substrate such that the first substrate and the second substrate approach each other to vary surface tension of the uncured adhesive until the load detecting mechanism detects the load has reached a predetermined value, and
      the uncured adhesive includes at least one of a UV-curable adhesive, a light-curable adhesive, thermosetting adhesive or radiation-curable adhesive.

2. The substrate laminating apparatus according to claim 1, wherein
   the first holding mechanism and the second holding mechanism are configured to hold the first substrate and the second substrate to be parallel to each other and to face each other,
   the apparatus further comprising:
      a position adjusting mechanism configured to adjust a relative position of the first substrate and the second substrate in a surface direction;
      an adhesive applying mechanism configured to apply the uncured adhesive between the first substrate and the second substrate; and
      a curing mechanism configured to cure the uncured adhesive.

3. The substrate laminating apparatus according to claim 2, wherein the load detecting mechanism is configured to detect a tensile load between the first substrate and the second substrate originated from the surface tension of the adhesive between the first substrate and the second substrate.

4. The substrate laminating apparatus according to claim 2, wherein
   an optical device and an optical aperture are arranged in one of the first substrate or the second substrate, and
   an area in which the optical aperture is arranged overlaps an area to which the uncured adhesive is applied.

5. A substrate laminating method comprising:
   holding a first substrate;
   applying an uncured adhesive to a predetermined area of the first substrate;
   holding a second substrate to face the first substrate;
   bringing the first substrate and the second: substrate closer to each other;
   detecting a tensile load between the first substrate and the second substrate originated from a surface tension of the uncured adhesive acting between the first substrate and the second substrate;
   detecting that the tensile load between the first substrate and the second substrate has reached a predetermined value; and
   stopping movement to bring the first substrate and the second substrate closer to each other when it is detected that the tensile load between the first substrate and the second substrate has reached the predetermined value.

6. The substrate laminating method according to claim 5, wherein
   the detecting that the tensile load between the first substrate and the second substrate has reached the predetermined value includes:
   detecting the tensile load between the first substrate and the second substrate that is generated by a surface tension of the uncured adhesive caused when the first substrate and the second substrate come in contact with each other through the adhesive;
   detecting increase of the tensile load between the first substrate and the second substrate as the first substrate and the second substrate approach each other;
   detecting decrease of the tensile load between the first substrate and the second substrate as a bonding area of the uncured adhesive spreads; and
   detecting that the tensile load between the first substrate and the second substrate has decreased to the predetermined value;
      wherein the uncured adhesive includes at least one of a UV-curable adhesive, a light-curable adhesive, thermosetting adhesive or radiation-curable adhesive.

7. The substrate laminating method according to claim 5, wherein
   an optical device is arranged in one of the first substrate or the second substrate, and
   the adhesive is applied to a predetermined area of the optical device.

8. The substrate laminating method according to claim 7, wherein
   a plurality of optical devices are arranged as an array in either one of the first substrate and the second substrate.

9. The substrate laminating method according to claim 5, further comprising:
   adjusting a relative position of the first substrate and the second substrate in a surface direction by a position adjusting mechanism after holding the first substrate and the second substrate to face each other and before bringing the first substrate and the second substrate closer to each other; and
   curing the uncured adhesive by a curing mechanism after stopping movement to bring the first substrate and the second substrate closer to each other.

10. The substrate laminating method according to claim 9, wherein
    a spread of the uncured adhesive is observed with an image after detecting that the tensile load between the first substrate and the second substrate has reached the predetermined value, and
    when the spread of the adhesive has become a predetermined spread state, the uncured adhesive is cured by the adhesive curing mechanism.

* * * * *